United States Patent [19]
Whitmarsh et al.

[11] Patent Number: 5,153,295
[45] Date of Patent: Oct. 6, 1992

[54] CARBOSILANE POLYMER PRECURSORS TO SILICON CARBIDE CERAMICS

[75] Inventors: Christopher K. Whitmarsh; Leonard V. Interrante, both of Schenectady, N.Y.

[73] Assignee: Rensselaer Polytechnic Institute, Troy, N.Y.

[21] Appl. No.: 556,599

[22] Filed: Jul. 20, 1990

[51] Int. Cl.$^5$ ............................................. C08G 77/12
[52] U.S. Cl. .................................... 528/31; 525/475; 528/10; 528/32; 556/480
[58] Field of Search .................. 525/475; 528/10, 31, 528/32; 556/480

[56] References Cited

U.S. PATENT DOCUMENTS

| | | | |
|---|---|---|---|
| 4,377,677 | 3/1983 | Iwai et al. | 528/16 |
| 4,472,591 | 9/1984 | Schilling, Jr. et al. | 528/14 |
| 4,631,179 | 12/1986 | Smith, Jr. | 423/345 |
| 4,783,516 | 11/1988 | Schilling, Jr. et al. | 528/32 |
| 4,923,716 | 5/1990 | Brown et al. | 427/249 |

OTHER PUBLICATIONS

S. Yajima et al., "Synthesis of Continuous Silicon Carbide Fibre with High Tensile Strength and High Young's Modulus", Journal of Materials Science 13 (1978) 2569-2576.

Primary Examiner—Melvyn I. Marquis
Attorney, Agent, or Firm—Richard P. Fennelly; Louis A. Morris

[57] ABSTRACT

Polycarbosilane compositions, which can serve as silicon carbide precursors, are formed by a Grignard coupling reaction of a halomethylcarbosilane followed by reduction using a metal hydride. The polycarbosilane compositions that result have a substantially 1:1 silicon to carbon stoichiometry, are substantially non-cyclic and branched, and comprise the repeat units $SiH_3CH_2-$, $-SiH_3CH_2-$, $=SiHCH_2-$, and $\equiv SiCH_2-$.

19 Claims, 4 Drawing Sheets

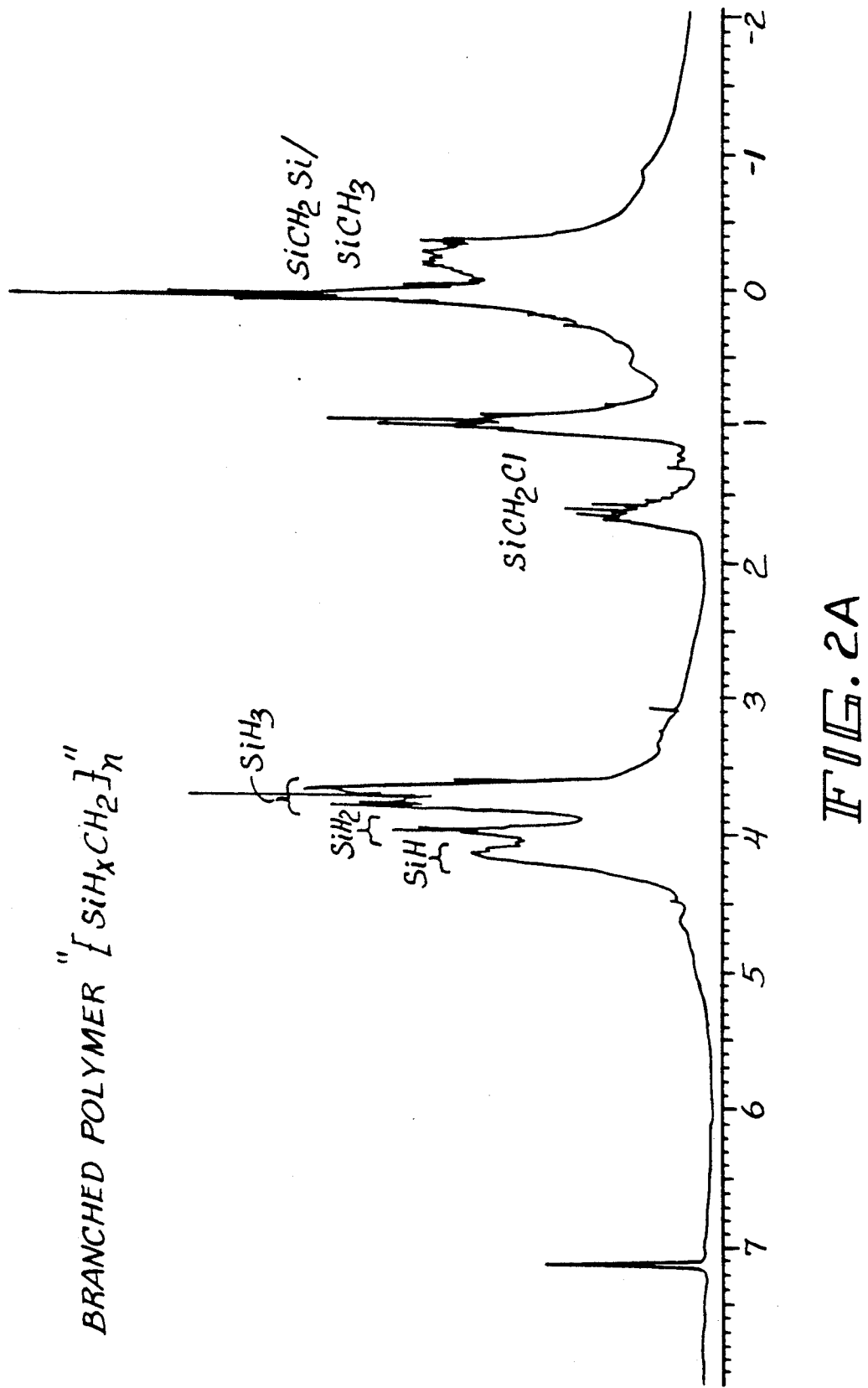

CARBOSILANE POLYMER PRECURSORS TO SILICON CARBIDE CERAMICS

BACKGROUND OF THE INVENTION

Silicon carbide (SiC) is one of several advanced ceramic materials which are currently receiving considerable attention as electronic materials, as potential replacements for metals in engines, and for a variety of other applications where high strength, combined with low density and resistance to oxidation, corrosion and thermal degradation at temperatures in excess of 1000° C., are required (K. J. Wynne et al., Ann. Rev. Mater. Sci. 14, 297 (1984)). Unfortunately, these extremely hard, non-melting ceramics are difficult to process by conventional forming, machining, or spinning applications rendering their use for many of these potential applications problematic. In particular, the production of thin films by solution casting, continuous fiber by solution or melt spinning, a SiC matrix composite by liquid phase infiltration, or a monolithic object using a precursor-based binder/sintering aid, all require a source of SiC which is suitable for solution or melt processing and which possesses certain requisite physical and chemical properties which are generally characteristic of polymeric materials.

Polymeric precursors to ceramics such as SiC afford a potential solution to this problem as they would allow the use of conventional processing operations prior to conversion to ceramic (Wynne et al., supra.). A ceramic precursor should be soluble in organic solvents, moldable or spinnable, crosslinkable, and give pure ceramic product in high yield on pyrolysis. Unfortunately, it is difficult to achieve all these goals simultaneously. Currently available SiC precursor systems are lacking in one or more of these areas. Problems have been encountered in efforts to employ the existing polysilane and polycarbosilane precursors to SiC for preparation of SiC fiber and monolithic ceramic objects. All of these precursors have C/Si ratios considerably greater than one, and undergo a complex series of ill-defined thermal decomposition reactions which generally lead to incorporation of excess carbon. The existence of even small amounts of carbon at the grain boundaries within SiC ceramics has been found to have a detrimental effect on the strength of the ceramic, contributing to the relatively low room-temperature tensile strengths typically observed for precursor-derived SiC fibers.

Efforts to develop polymeric precursors to SiC have focused largely on two types of polymers, polysilanes, which have a Si—Si backbone, and polycarbosilanes, in which the polymer backbone is $[-Si-C-]_n$. The polysilanes all suffer from problems due to insolubility, infusibility and/or excess carbon incorporation. Certain of the polycarbosilanes have more suitable physical properties for processing; however, in general, these also contain a higher-than-1:1 C:Si ratio and incorporate excess carbon on pyrolysis.

In the case of the polycarbosilanes, high molecular weight linear polymers of the type $[R_2SiCH_2]_n$, where R is H and/or hydrocarbon groups, have been prepared by ring-opening-polymerization (ROP) reactions starting from cyclic disilacyclobutanes using chloroplatinic acid and related catalyst systems (see W. R. Bamford et al., J. Chem. Soc., C(1966) 1137); however, such linear polycarbosilanes generally exhibit low yields of ceramic product on pyrolysis due to chain "unzipping" reactions (Wynne et al., supra.). For example, studies of high molecular weight $[Me_2SiCH_2]_n$ polymers have indicated virtually complete volatilization on pyrolysis under an inert atmosphere to 1000° C. (Wynne et al., supra.). Recent work by the instant inventors on the related $[MeHSiCH_2]_n$ polymer suggests that the introduction of Si—H groups leads to crosslinking reactions on pyrolysis and, subsequently, higher ceramic yields; however, significant loss of volatile organo-silane by-products as well as hydrocarbons on pyrolysis was still evident.

Smith (see U.S. Pat. No. 4,631,179) has employed this ROP method to obtain what is claimed to be a linear polymer of the formula $[SiH_2CH_2]_n$. This polymer was reported to exhibit ceramic yields up to 85% on pyrolysis. The starting material for the ROP reaction was the cyclic compound $[SiH_2CH_2]_2$, which is difficult and costly to obtain in pure form by either of the procedures that have been reported (see J. Laane, J. Am. Chem. Soc., 89, 1144 (1967) and R. M. Irwin et al., J. Am. Chem. Soc., 99, 3273 (1976)).

SUMMARY OF THE INVENTION

The instant invention relates to the preparation of new compositions of matter which have potential utility as precursors to silicon carbide (SiC). These compositions are obtained by a Grignard coupling process starting from chlorocarbosilanes, a readily available class of compounds. The new precursors constitute a fundamentally new type of polycarbosilane that is characterized by a branched, $[Si-C]_n$ "backbone" comprised of $SiR_3CH_2-$, $-SiR_2CH_2-$, $=SiRCH_2-$, and $\equiv SiCH_2-$ units (where R is usually H but can also be other organic or inorganic groups, e.g., lower alkyl or alkenyl, as may be needed to promote crosslinking or to modify the physical properties of the polymer or the composition of the final ceramic product). A key feature of these polymers is that substantially all of the linkages between the Si—C units are "head-to-tail", i.e., they are Si to C.

A preferred embodiment of this invention is the polycarbosilane "SiH₂CH₂" which has a carbon to silicon ratio of 1 to 1 and where substantially all of the substituents on the polymer backbone are hydrogen. This polymer consists largely of a combination of the four polymer "units": $SiH_3CH_2-$, $-SiH_2CH_2-$, $=SiHCH_2-$, and $\equiv SiCH_2-$ which are connected "head-to-tail" in such a manner that a complex, branched structure results. The branched sites introduced by the last two "units" are offset by a corresponding number of $SiH_3CH_2-$ "end groups" while maintaining the alternating Si—C "backbone". The relative numbers of the polymer "units" are such that the "average" formula is $SiH_2CH_2$. These polymers have the advantage that it is only necessary to lose hydrogen during pyrolysis, thus ceramic yields of over 90% are possible, in principle. The extensive Si—H functionality allows facile crosslinking and the 1 to 1 carbon to silicon ratio and avoids the incorporation of excess carbon in the SiC products that are ultimately formed.

Another advantage of these precursors is that the synthetic procedure employed to make them allows facile modification of the polymer, such as by introduction of small amounts of pendant vinyl groups, prior to reduction. The resulting vinyl-substituted "SiH₂CH₂" polymer has been found to have improved crosslinking properties and higher ceramic yield.

DESCRIPTION OF THE DRAWINGS

The Drawings also form a portion of the present specification wherein:

FIG. 2A shows the $^1$H NMR spectrum of the reduced branched polymer —[SiH$_x$CH$_2$]$_n$—;

DISTINCTION BETWEEN PRIOR ART AND THE INSTANT INVENTION

Figure 1:
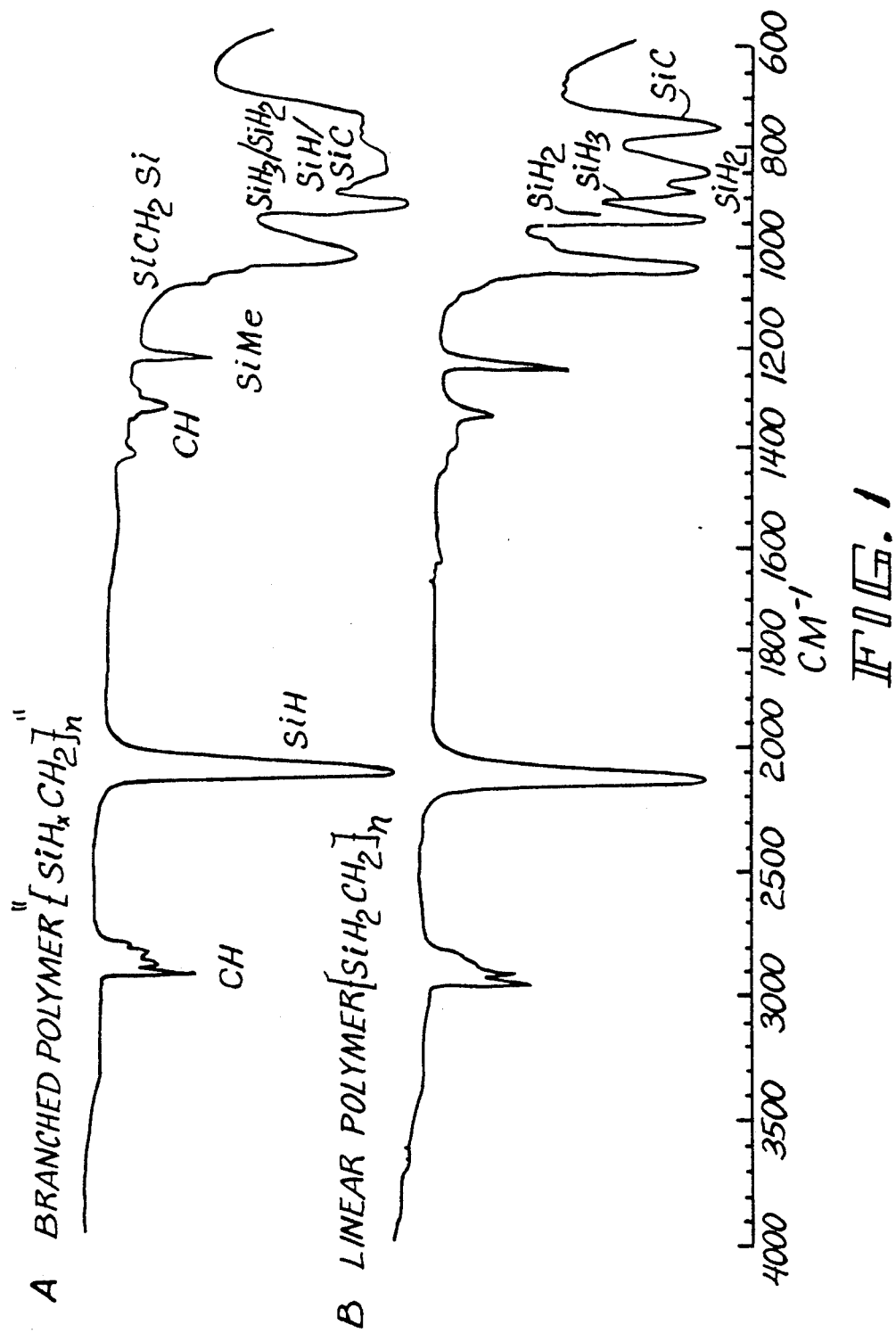
FIG. 1 shows the infrared spectra for the branched polymer —[SiH$_x$CH$_2$]$_n$— and the linear polymer —[SiH$_2$CH$_2$]$_n$— of Smith.

Yajima, prepared a preceramic polymer by a thermally induced methylene insertion reaction of poly(dimethylsilane) (see J. Mater. Sci., 13, 2569 (1978)). The resulting polymer is only approximately represented by the formula [SiHMeCH$_2$]$_n$, as significant amounts of unreacted (SiMe$_2$)$_n$ units, complex rearrangements, and branching are observed. Neither the preparation nor the resulting structure of this precursor are therefore similar to the instant invention. In addition to the carbosilane "units", large amounts of Si—Si bonding remains in the "backbone" of the polymer. Yajima's polymer, in contrast to the instant invention, contains twice the stoichiometric amount of carbon for SiC formation. The excess carbon must be eliminated through pyrolytic processes that are by no means quantitative. Despite the shortcomings, Yajima's polymer has been employed to prepare "SiC" fiber. However, it must be treated with various crosslinking agents prior to pyrolysis which introduce contaminants. This results in a final ceramic product that contains significant amounts of excess carbon and silica which greatly degrade the high temperature performance of the fiber.

Schilling, and others have claimed for use as SiC precursors predominately linear polycarbosilanes prepared via potassium dechlorination of chlorochloromethyl-dimethylsilane (see Cer. Bull. 62, 912 (1983)). The resulting polymers have not been fully characterized, but probably contain significant numbers of Si—Si and CH$_2$—CH$_2$ groups in the polymer backbone. The alkali metal dechlorination process used in the synthesis of such materials does not exhibit the selective head-tail coupling found with Grignard coupling. The pendant methyl groups in such materials also lead to the incorporation of excess carbon into the system.

Schilling has also studied several polymer systems where mixtures containing vinylchlorosilanes (such as CH$_2$=CH—Si(Me)Cl$_2$) and Me$_2$SiCl$_2$ are coupled by dechlorination with potassium in tetrahydrofuran (see Cer. Bull. 62, 912 (1983) and U.S. Pat. Nos. 4,414,403 and 4,472,591). The "backbone" of the resulting polymers consists of a combination of Si—Si and Si—CH$_2$CH(—Si)$_2$ units. Later versions of this polymer (see Polymer Preprints 25, 1 (1984)) use Me(H)SiCl$_2$ in addition to the Me$_2$SiCl$_2$, and are subjected to a sodium-hydrocarbon dechlorination process which does not attack vinyl groups. The resulting polymer consists of a predominately linear, Si—Si "backbone" bearing pendant methyl groups, with some Si—H and Si—CH=CH$_2$ functionality to allow crosslinking on pyrolysis.

None of these precursors derived using vinylchlorosilanes are similar to the instant invention in that, having predominantly Si—Si bonded "backbones", they are essentially polysilanes, not polycarbosilanes. In addition, the carbon in these polymers is primarily in the form of pendant methyl functionality and is present in considerable excess of the desirable 1 to 1 ratio with silicon. The ceramic products obtained from these polymers are known to contain considerable amounts of excess carbon (see, for example, B. A. Bishop et al., Cer. Trans. 1, (B), 856 (1988)).

Baney and coworkers have obtained polymeric precursors to SiC by redistribution reactions of methylchloro-disilane (Me$_{6-x}$Cl$_x$Si$_2$, x=2–4) mixtures, catalyzed by tetraalkyl-phosphonium halides (see Organometallics, 2, 860 (1983) and U.S. Pat. Nos. 4,310,481, 4,310,482 and 4,472,591). In a typical preparation, elemental analysis of the polymer was employed to suggest the approximate formula [Si(Me)$_{1.15}$(H)$_{0.25}$]$_n$, with n averaging about 20. The reaction is fundamentally different than that involved in the instant invention and the structures of the polymers are also entirely different, involving what is reported to be a complex arrangement of fused polysilane rings with methyl substitution and a polysilane backbone.

The formation of carbosilane polymers with pendent methyl groups was reported by Kriner (J. Org. Chem. 29, 1601 (1964)) as by-products of the "reverse-Grignard" reaction of chloromethyl-dichloro-methylsilane. The chief purpose of this work was the preparation of carbosilane rings and the polymeric byproduct was not characterized in detail nor was its use as a SiC precursor suggested. Our studies of this material indicate that it has an unacceptably low ceramic yield on pyrolysis. These polymers are related to those described in the instant invention and are obtained by a similar procedure, however, they contain twice the required amount carbon necessary for stoichiometric silicon carbide and their use as SiC precursors was not suggested. Moreover, the starting material, chloromethyl-dichloromethylsilane, contains only two sites on the Si atom for chain growth and therefore cannot yield a structure which contains ≡SiCH$_2$— chain units. On this basis, the structure of the polymer obtained, as well as its physical properties and pyrolysis characteristics, must be significantly different from that of the subject invention.

The polymer described by Smith (U.S. Pat. No. 4,631,179) as a product of the ring-opening polymerization of (SiH$_2$CH$_2$)$_2$ also has the nominal composition "SiH$_2$CH$_2$". However, the actual structure of this polymer is fundamentally and functionally different from that of the instant invention. Instead of a highly branched structure comprised of SiR$_3$CH$_2$—, —SiR$_2$CH$_2$—, =SiRCH$_2$—, and ≡SiCH$_2$— units, the Smith polymer is reported to be a linear polycarbosilane which presumably has only [SiH$_2$CH$_2$] as the internal chain segments. Such a fundamental structural difference would be expected to lead to quite different physical and chemical properties.

The fundamental difference in these two structures has been verified in our own laboratories by the preparation of a linear polymer analogous to that described by Smith and the comparison of its infrared and H NMR spectra. The results of this experiment are described in Example 10 hereinbelow.

Another important difference between the invention of Smith and the instant invention is the method used to obtain the product polymer and the nature of the starting materials. The [SiH$_2$CH$_2$]$_2$ monomer used by Smith is difficult and expensive to prepare and not generally available, whereas the chlorocarbosilanes used in the instant invention are readily available through commercial sources.

D. W. Brown and coworkers describe the chemical vapor deposition of silicon carbide using a "single molecular species" which provides reactive fragments containing both silicon and carbon atoms in equal number (see U.S. Pat. No. 4,923,716). Linear and cyclic structures of up to six units are mentioned. These compounds, which include both silanes and carbosilanes, are specifically chosen to be volatile for CVD use, and are distinctly different from the instant invention, where the products are polymers of sufficiently high molecular weight that they crosslink before significant volatilization occurs. Such volatility would be highly undesirable for the applications under consideration for the polymers of the instant invention, where excessive loss of the silicon-containing compound by vaporization on heating would be unacceptable.

The Examples which follow illustrate various embodiments of the present invention.

EXAMPLES

All manipulations involving air-sensitive materials were carried out in oven-dried glassware using standard inert atmosphere techniques. Solvents were distilled, under nitrogen, from appropriate drying agents. Magnesium powder (#50 mesh) was reground, under nitrogen, to expose fresh metal surfaces before use. Other commercially available reagents were used as received, unless otherwise specified.

In these examples, the Grignard coupling of a chloromethyl-chlorosilane or a mixture of chloromethyl-chlorosilanes is employed to obtain an intermediate polychlorocarbosilane of the approximate composition, [SiCl$_{2-x}$R$_x$CH$_2$] (equation 1). This intermediate can be isolated and employed in reactions with various reagents in order to add other functional groups to the polymer backbone (equation 2) prior to reduction (equation 3) or else can be reduced directly with an appropriate hydride source to obtain the [SiH$_{2-x}$R$_x$CH$_2$]$_n$ polymer (equation 4). For simplicity these polymers have been represented by the "average" formulas, for example: "[SiCl$_2$CH$_2$]$_n$" and "[SiH$_2$CH$_2$]$_n$", although it is clear from NMR and IR analyses that their actual structure is highly branched and contains segments which have up to four carbon atoms around Si. The reduced polymer incorporates extensive Si—H functionality and a nominal 1:1 silicon to carbon ratio except when it is desired to introduce additional functional groups in order to alter the physical or chemical characteristics of the polymer (i.e., R is not equal to H). On heating, due to the extensive Si—H functionality, direct thermal crosslinking occurs at relatively low temperatures, leading to high ceramic yields of a black, ceramic product found to contain beta-SiC by X-ray diffraction.

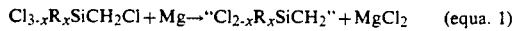

Cl$_{3-x}$R$_x$SiCH$_2$Cl + Mg → "Cl$_{2-x}$R$_x$SiCH$_2$" + MgCl$_2$ (equa. 1)

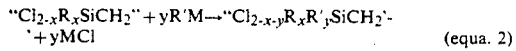

"Cl$_{2-x}$R$_x$SiCH$_2$" + yR'M → "Cl$_{2-x-y}$R$_x$R'$_y$SiCH$_2$" + yMCl (equa. 2)

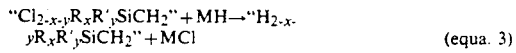

"Cl$_{2-x-y}$R$_x$R'$_y$SiCH$_2$" + MH → "H$_{2-x-y}$R$_x$R'$_y$SiCH$_2$" + MCl (equa. 3)

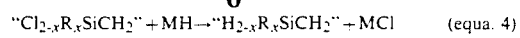

"Cl$_{2-x}$R$_x$SiCH$_2$" + MH → "H$_{2-x}$R$_x$SiCH$_2$" + MCl (equa. 4)

EXAMPLE 1

Preparation of poly(chlorocarbosilane) [SiCl$_2$CH$_2$]$_n$

Dry ether (1 L) and 30 g magnesium powder (1.25 mole) were added to a 2 L, 3N (three necked), RB (round bottom) flask equipped with reflux condenser, mechanical stirrer, and a nitrogen inlet. Chloromethyltrichlo-rosilane (126 ml, 1.0 mole) was added over about 8 hours using a syringe at a suitable rate to maintain a vigorous reaction. If desired, a few drops of methyl iodide can be added to the mixture to aid in starting the reaction. Alternatively, a pretreatment of the Mg with a small amount of iodine, followed by heating and evacuation to remove the excess iodine, can be used to initiate the reaction. A warm water bath (50° C.) was also employed as necessary to help maintain the reaction rate. After the addition was complete, a highly air-sensitive, dark brown solution, containing only small amounts of magnesium chloride and excess magnesium was obtained. Continued reflux for 2–5 days caused a gradual color change, to brownish-yellow, as large amounts of MgCl$_2$ precipitated. Due to the large volume of solid which formed, addition of more ether was required to maintain a reasonably fluid consistency. The ether solution was isolated from the solids by filtration. A second ether extraction was performed on the solid residue. The yellowish liquid fractions were combined and stripped of ether to yield "[SiCl$_2$CH$_2$]$_n$", a dark yellow-brown, moisture-sensitive, viscous oil in 45–50% yield. However, it is not necessary to remove the ether unless it is desired to study this intermediate poly(chlorocarbosilane). Characterization by IR, $^1$H, $^{13}$C, and $^{29}$Si NMR methods confirmed the presence of the units: SiCl$_3$CH$_2$—, —SiCl$_2$CH$_2$—, =SiClCH$_2$—, and ≡SiCH$_2$— in this polymer.

EXAMPLE 2

Part A - Reduction of "[SiCl$_2$CH$_2$]$_n$" to "[SiH$_2$CH$_2$]$_n$"

[SiCl$_2$CH$_2$]$_n$ (56 g, 0.5 mole) dissolved in 500 ml ether was transferred to a 1 L, 3N, RB flask equipped with reflux condenser, magnetic stirrer, nitrogen inlet, and cool (10° C.) water bath. LiAlH$_4$ (12.3 g, 0.3 mole, 30% excess) suspended in 200 ml ether was added over about 30 min., via cannulla or syringe, with rapid stirring. The resulting light grey suspension was refluxed overnight under nitrogen.

Part B - The crude, reduced products were subjected to aqueous workup as follows Initially, approximately 3M HCl was added dropwise to the rapidly stirred LiAlH$_4$/polymer/ether slurry. After the reactivity lessened, the remainder of about 1 liter of the acid was poured in, resulting in the dissolution of the lithium and aluminum salts. The ether layer was separated, again washed with dilute HCl, and the ether was stripped off to yield a cloudy, yellow oil. This oil was redissolved in pentane to drive out small amounts of emulsified water and residual aluminum complexes. After settling, the transparent yellow pentane solution was easily separated from the residue and stripped of solvent, under vacuum, with warming to 75° C. A viscous, transparent, pale yellow polymer was obtained in about 85% yield (40% overall, from Cl$_3$SiCH$_2$Cl). Examination of this polymer by IR, $^1$H, $^{13}$C, and $^{29}$Si NMR confirmed the presence of the units:

$SiH_3CH_2-$, $-SiH_2CH_2-$, $=SiHCH_2-$, and $\equiv SiCH_2-$. Analysis of this polymer by gel permeation chromatography (GPC) using polystyrene standards indicated a wide molecular weight distribution of 300–80,000 amu, with the majority of the polymer falling between 300–3000 amu. The $MW_n$ (750), $MW_w$ (5200) and polydispersity (6.9) reflect the broad MW distribution of this polymer.

EXAMPLE 3

Preparation of modified "$[SiH_2CH_2]_n$" polymer with pendent vinyl groups

"$[SiCl_2CH_2]_n$", (5 g, 0.044 mole), prepared as in Example 1, was dissolved in approximately 50 ml of dry ether. To this solution was added, with stirring, 4.4 ml (0.0044 mole) of commercially available vinyl Grignard solution (1M in THF). The mixture was magnetically stirred, for forty eight hours. A small amount of $MgCl_2$ separated by settling and the pale yellow solution was transferred by cannula to a new flask. $LiAlH_4$ (1.15 g, 0.03 mole, about 25% excess) suspended in ether was added over a few minutes, and the mixture was allowed to stir overnight. The crude reduced products were subjected to aqueous/acid workup as described in Example 2, Part B. Examination of the vinyl-substituted, reduced polymer by IR and $^1H$ NMR spectroscopy confirmed the incorporation of vinyl functionality. In this particular example, about 1 in 10 polymer units was vinyl-substituted. Both lower and higher levels of substitution can be readily obtained by using this same procedure.

EXAMPLE 4

Reprocessing of crude "$[SiCl_2CH_2]_n$" with magnesium and ether to obtain a higher molecular weight polymer Crude poly(chlorocarbosilane) "$[SiCl_2CH_2]_n$" was prepared and isolated from the $MgCl_2$ solids as in Example 1 except that the ether was not removed. Additional Mg powder was added to this solution, and refluxing was continued for an additional 2 to 3 days. Considerably more $MgCl_2$ was produced by this procedure indicating that further coupling was occurring. The reprocessed poly(chloro-carbosilane) is removed by cannula as in Example 1 and was reduced by the procedure in Example 2. Reduced polymer with substantially higher molecular weight (by GPC) was obtained.

EXAMPLE 5

Use of CuCN catalyst to obtain a higher molecular weight "$[SiCl_2CH_2]_n$" polymer

Method A

CuCN is known to catalyze the reaction of halosilanes with Grignard reagents and is particularly useful when one or both of the reactants are sterically hindered (Organometallics 8, 112 (1989)). Preparation of poly(chlorocarbosilane) was performed as in Example 1, except, after all of the chloromethyl-trichlorosilane had been added, forming the dark solution, the CuCN (about 0.5–1 g/per mole of $Cl_3SiCH_2Cl$) was added. The stirring and reflux were continued as described in Example 1. The resulting polymer was separated from the $MgCl_2$ solids as in Example 1, and was reduced as in Example 2 to give a polymer with increased molecular weight. The presence of the copper compound did not appear to interfere with the reduction or the aqueous/acid workup, and the appearance of the final reduced polymer was unchanged.

Method B

"$[SiCl_2CH_2]_n$" was prepared as in Example 1 but the CuCN was not introduced until after the $MgCl_2$ had formed and the reaction appeared to be mostly complete. The reflux and stirring were continued for another 2 to 3 days. The remainder of the preparation was as described in Examples 1 and 2. The "$[SiH_2CH_2]_n$" product was found to have a higher molecular weight than that obtained without the CuCN treatment.

EXAMPLE 6

Reduction of $[SiCl_xCH_2]_n$ without isolation from the $MgCl_2$ solids

Crude poly(chlorocarbosilane) was prepared as in Example 1 except that the separation from the $MgCl_2$ solids was omitted. $LiAlH_4$ (about 50% excess) was added to this slurry as a suspension in ether, resulting in a change in color from yellowish to grey. The resulting mixture was allowed to reflux over night with mechanical stirring. The "aqueous work-up" was performed in the same manner as described in Example 2, Part B. Vigorous foaming during the initial dropwise addition of dilute HCl (approximately 3M) to the crude product showed that an excess of $LiAlH_4$ was present. This process takes longer, but recovers more reduced polymer than was obtained by the combination of procedures described in Examples 1, 2A, and 2B. The IR and NMR spectra of the product was similar to that prepared by combination of Examples 1, 2A, and 2B. GPC analysis also gave similar results, the majority of the polymer falling between 400 and 3400 amu, with an $M_n$ of 681.

EXAMPLE 7

Crosslinking of a polycarbosilane with pendant vinyl groups by chloro-platinic acid Polycarbosilane with pendant vinyl groups was prepared by the method described in Example 3. About 1 g was mixed with a catalytic amount (about 0.02 g) of chloroplatinic acid. The mixture was placed in a heavy-wall glass tube, freeze-thaw degassed and the tube sealed. The tube was heated to 150° C. in an oil bath overnight producing a pale yellow, glassy solid. Examination of this solid by IR showed that the characteristic bands associated with vinyl groups were absent, suggesting that crosslinking by hydrosilation had occurred.

EXAMPLE 8

Pyrolysis of a polycarbosilane precursor to SiC

Samples of the polycarbosilane resulting from the combination of coupling procedures described in Examples 1, 4, and 5 (followed by reduction as in Examples 2A and B) were heated under nitrogen to study the pyrolysis process. Gradual heating showed that initiation of thermal crosslinking of these polymers occurred at temperatures between 150° C. and approximately 300° C., depending on the experimental procedures employed for formation of the polymer. The higher MW polymer samples were found to crosslink at lower temperatures. The major byproduct of the pyrolysis process is hydrogen with methane, ethane, ethylene, propene and methyl silanes being observed in small amounts. TGA studies of these polymers (without any special crosslinking procedures) to 1200° C. under nitrogen show from 30 to 60% ceramic yield depending on the MW of the polymer used and the heating rate in the TGA experiment. After crosslinking by heating for several hours at 150°-300° C., the solid polymer samples obtained were found to have much higher ceramic yields by TGA (80-90%). The theoretical yield is about 90% for this polymer. XRD of the black ceramic products obtained at 1000° C. showed them to be essentially amorphous. Elemental analysis is consistent with a stoichiometric SiC formula. Material heated to 1600° C. (five hours under N2) gave an XRD pattern consistent with beta-SiC.

EXAMPLE 9

Pyrolysis of a polycarbosilane with pendant vinyl groups

Crosslinked polycarbosilane prepared as described in Example 7 was examined by TGA (to 1200° C., under N$_2$). The solid glassy chunks did not melt during the pyrolysis. However, considerable shrinking was observed. A ceramic yield of 72% was obtained. The theoretical ceramic yield for this system (with about 10% vinyl substitution) is about 85%.

COMPARATIVE EXAMPLE 10

Preparation of a linear poly[dihydrocarbosilane] [—SiH$_2$CH$_2$—]$_n$ similar to that described in the Smith patent (U.S. Pat. No. 4,631,179)

A Grignard coupling reaction of bis[diethylamino]-chlorochloromethylsilane, ClSi[NEt$_2$]$_2$CH$_2$Cl was employed to prepare a linear polymer of the formula [—Si(NEt$_2$)$_2$CH$_2$—]$_n$. The diethylamino groups block two chlorine sites preventing branching of the polymer. Subsequent treatment with HCl gas replaced the diethyl-amino groups with chlorine yielding a linear polymer [—SiCl$_2$CH$_2$—]. Reduction of this polymer with LiAlH$_4$ produced the linear Si—H bearing polymer [—SiH$_2$CH$_2$—]$_n$ similar to that which is obtained by the methods described in the Smith patent.

CHARACTERIZATION OF THE "[SiH$_2$CH$_2$]$_n$" POLYMER AND VERIFICATION OF ITS UNIQUE, HIGHLY BRANCHED STRUCTURE

The "[SiH$_2$CH$_2$]$_n$" polymer obtained by the procedures described in the previous sections is a viscous, yellow oil that, despite extensive Si—H functionality, appears to be relatively stable to air exposure. The IR spectrum of this polymer (FIG. 1A) is consistent with the proposed, highly branched, structure [SiH$_x$CH$_2$]$_n$ (where x=0, 1, 2, 3). Strong peaks at 2140, 930, 830, and 760 cm$^{-1}$ confirm the presence of ≡SiH, =SiH$_2$, and —SiH$_3$ groups (15). A strong absorption at 1040 cm$^{-1}$ is characteristic the alternating Si—CH$_2$—Si structure in this polymer. The absence of the characteristic peak for the SiCH$_2$CH$_2$Si functionality between 1120 and 1180 cm$^{-1}$ indicates that little or no head-to-head coupling is present.

Figure 2B:
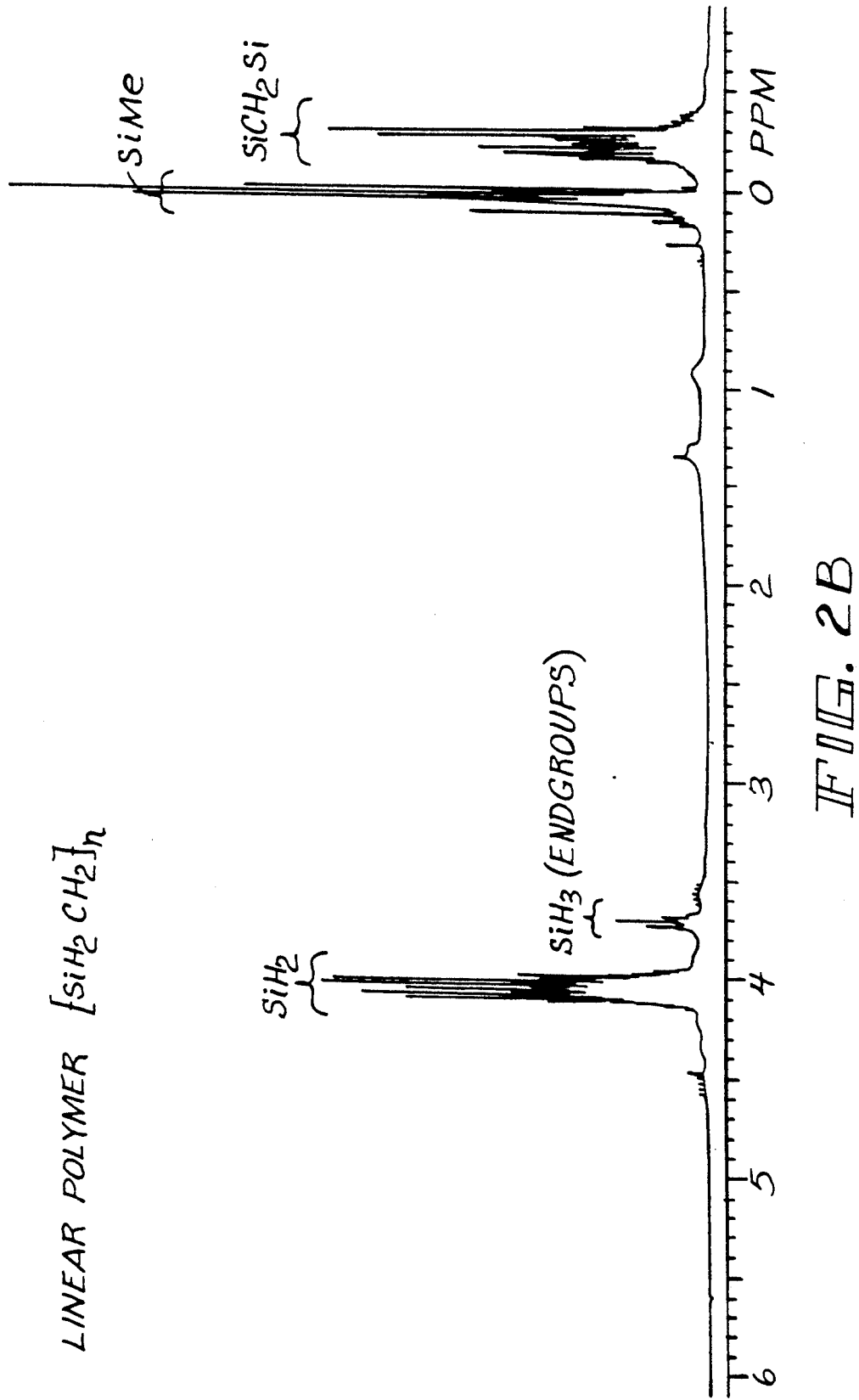
FIG. 2B shows the $^1$H NMR spectrum of the reduced linear polymer —[SiH$_2$CH$_2$]$_n$— of Smith.

The $^1$H NMR spectrum of the reduced polymer (FIG. 2A), consisting of complex multiplets and broad peaks, is suggestive of a complex, branched structure. Two groups of peaks centered at −0.2, and 0.15 ppm are attributed to the various SiCH$_2$Si environments. Residual chloromethyl functionality not reduced by LiAlH$_4$ treatment appears as a peak at 1.65 ppm. The three groups of peaks at 3.7, 3.95, and 4.2 ppm originate from —SiH$_3$, =SiH$_2$, and ≡SiH groups respectively. This spectrum contrasts markedly with that obtained for the related linear [SiH$_2$CH$_2$]$_n$ polymer of Smith obtained by ring opening polymerization of [SiH$_2$CH$_2$]$_2$ (FIG. 2B), showing clearly the fundamental difference in structure between these two polymers. This conclusion is also supported by the comparison of the corresponding IR spectra for these two polymers (FIGS. 1A and 1B).

The data from the $^{13}$C NMR of the "[SiH$_2$CH$_2$]$_n$" polymer obtained in the instant invention are consistent with assignments from the $^1$H spectra, the major feature being a broad, complicated multiplet extending from −12 to 8 ppm. A small group of peaks at 25 ppm is attributed to residual SiCH$_2$Cl functionality not completely reduced by the LiAlH$_4$ treatment.

Figure 3:
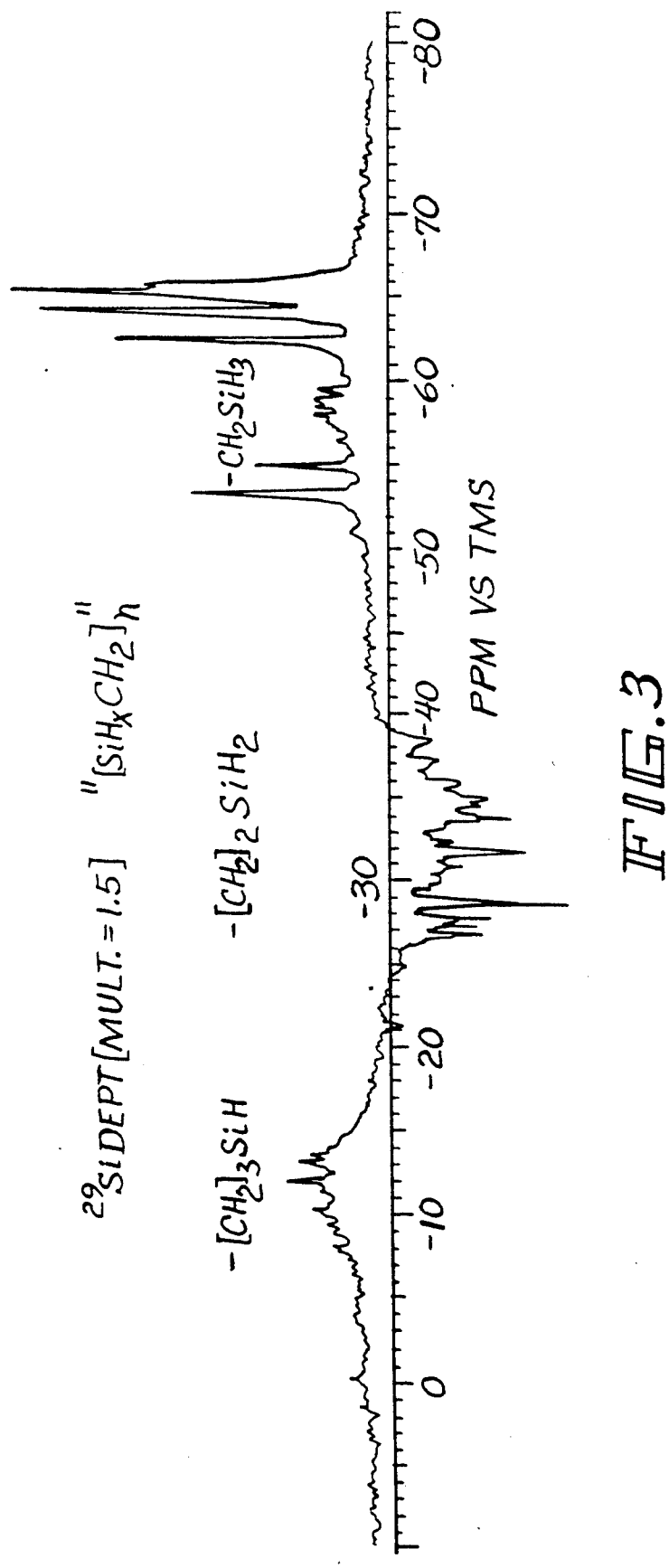
FIG. 3 shows the decoupled $^{29}$Si NMR spectrum of the reduced polymer —[SiH$_x$CH$_2$]$_n$—.

The decoupled $^{29}$Si "DEPT" NMR spectrum (FIG. 3; multiplicity of 1.5) of the reduced polymer [SiH$_x$CH$_2$]$_n$, shows that the groups of peaks between −8 and −14 and several resolved singlets between −53 and −66 ppm have odd numbers of hydrogens, whereas those between −26 and −39 have an even number. This is consistent with assignments as ≡SiHCH$_2$—, SiH$_3$CH$_2$— and —SiH$_2$CH$_2$— polymer functionalities respectively, (where the unspecified bonding is carbon-to-silicon). The complexity of these NMR spectra reflects the branched structure of the polymer, which can contain many slightly different environments for each type of silicon.

The Examples set forth herein, along with the additional characterization data reported in the foregoing "Characterization . . ." section are presented to describe certain embodiments of the instant process and should not be construed in a limiting sense for that reason. The scope of protection sought is set forth in the claims which follow which also form a portion of the instant description of the invention to the extent that it is not reflected earlier.

We claim:

1. Polycarbosilane compositions of matter comprising the repeat units [SiR$_x$CH$_2$] and [SiR$_{x-1}$(CH=CH$_2$)CH$_2$], where R is hydrogen and x is from 0 to 3 and 1 to 3, respectively.

2. A process for forming polycarbosilane composition comprising the repeat unit [SiR$_x$CH$_2$], where R is hydrogen and x ranges from 0 to 3 which employs, as starting materials, a halomethylcarbosilane of the type [X$_3$SiCH$_2$X] or X$_{4-x}$Si(CH$_2$X)$_x$, where X is halo and x is from 0 to 3, and which comprises a Grignard coupling reaction of the halomethylcarbosilane with magnesium to form a poly(halocarbosilane) followed by reduction of the poly(halocarbosilane).

3. A process as claimed in claim 2 wherein the halomethylcarbosilane is trichloro-chloromethylsilane.

4. A process as claimed in claim 2 wherein the Grignard coupling reaction is carried out using a mixture of magnesium metal and solvent.

5. A process as claimed in claim 4 wherein the magnesium metal is in the form of an amalgam with mercury or is produced in situ by reduction of a magnesium halide.

6. A process as claimed in claim 4 wherein the solvent is an ether.

7. A process as claimed in claim 4 wherein the solvent is diethylether.

8. A process as claimed in claim 4 wherein the solvent is a tertiary amine.

9. A process as claimed in claim 4 wherein the solvent is a hydrocarbon or a mixture of a hydrocarbon with an ether, polyether, or amine.

10. A process as claimed in claim 3 wherein the trichloro-chloromethylsilane is mixed with trichlorosilane or tetrachloro-silane.

11. A process as claimed in claim 3 wherein a mixture of halomethylsilanes of the general type $X_3Si-CH_{(3-n)}X_n$, where n is 2 or 3, or $X_{3-x}R_xSiCH_2X$, where R can be either an organic or inorganic group and x can be 1 or 2, is employed in addition to the trichloro-chloromethylsilane.

12. A process as claimed in claim 3 wherein the trichloro-chloromethyl silane is mixed with compounds of the general formula $X_{3-x}Si(CH_2X)_x$ where X is 1 or 2.

13. A process as claimed in claim 2 wherein a metal cyanide is added during the Grignard coupling reaction.

14. A process as claimed in claim 16 wherein the metal cyanide is copper(I) cyanide.

15. Substantially non-cyclic, branched polycarbosilane precursors for silcon carbide having a substantially 1:1 silicon to carbon stoichiometry which are comprised of the repeat units $[SiH_3CH_2-]$, $[-SiH_3CH_2-]$, $[-SiH_2CH_2-]-$, $[=SiHCH_2-]$, $[\equiv SiCH_2-]$.

16. Precursors to silicon carbide as claimed in claim 15 formed by the process of claim 2.

17. Precursors as claimed in claim 15 in which the average number of Si—H groups per unit is approximately equal to 2.

18. Precursors as claimed in claim 15 which contain terminal $-SiH_3$ groups.

19. Substantially non-cyclic, branched polycarbosilane precursors for silicon carbide which are comprised of the repeat units $[SiR_xCH_2]$ and $[SiH_{x-1}(CH=CH_2CH_2]$, where R is hydrogen and x can range from 0 to 3 and 1 to 3, respectively.

* * * * *